(12) United States Patent
Schatz

(10) Patent No.: US 7,644,904 B1
(45) Date of Patent: Jan. 12, 2010

(54) PRESSURE RELIEF VALVE FOR USE IN CEMENTITIOUS MATERIAL PUMPING SYSTEMS

(75) Inventor: Ben P. Schatz, Des Plaines, IL (US)

(73) Assignee: ChemGrout Inc., La Grange Park, IL (US)

( * ) Notice: Subject to any disclaimer, the term of this patent is extended or adjusted under 35 U.S.C. 154(b) by 416 days.

(21) Appl. No.: 11/607,414

(22) Filed: Dec. 1, 2006

(51) Int. Cl.
*F16K 5/00* (2006.01)
(52) U.S. Cl. .................. 251/309; 137/625.47
(58) Field of Classification Search ............ 137/625.46, 137/625.47; 251/309
See application file for complete search history.

(56) References Cited

U.S. PATENT DOCUMENTS

| 920,268 A | * | 5/1909 | Caskey | 137/625.47 |
| 1,371,638 A | * | 3/1921 | Migues | 137/625.22 |
| 3,498,317 A | * | 3/1970 | Duffey | 137/375 |
| 4,967,797 A | * | 11/1990 | Manska | 137/625.47 |

* cited by examiner

*Primary Examiner*—John K Fristoe, Jr.
(74) *Attorney, Agent, or Firm*—Wildman, Harrold, Allen & Dixon LLP

(57) ABSTRACT

A pressure relief valve integrally formed with a section of conduit in a closed system for pumping cementitious material eliminates any dead space in the system within which the cementitious material may flow and set, and thus avoids system disassembly for cleaning following use and the possible replacement of clogged system components. The pressure relief valve includes a hollow cylindrical housing disposed on a conduit. First and second elongated linear slots are aligned with the cylindrical housing's longitudinal axis and are disposed in opposed portions of housing, with one slot in flow communication with the conduit. A cylindrical drum having a third elongated linear slot disposed within the cylindrical housing is freely rotatable therein. A handle attached to one end of the drum allows for manual rotation of the drum for aligning the three slots permitting the discharge of cementitious material and release of pressure in the system.

19 Claims, 3 Drawing Sheets

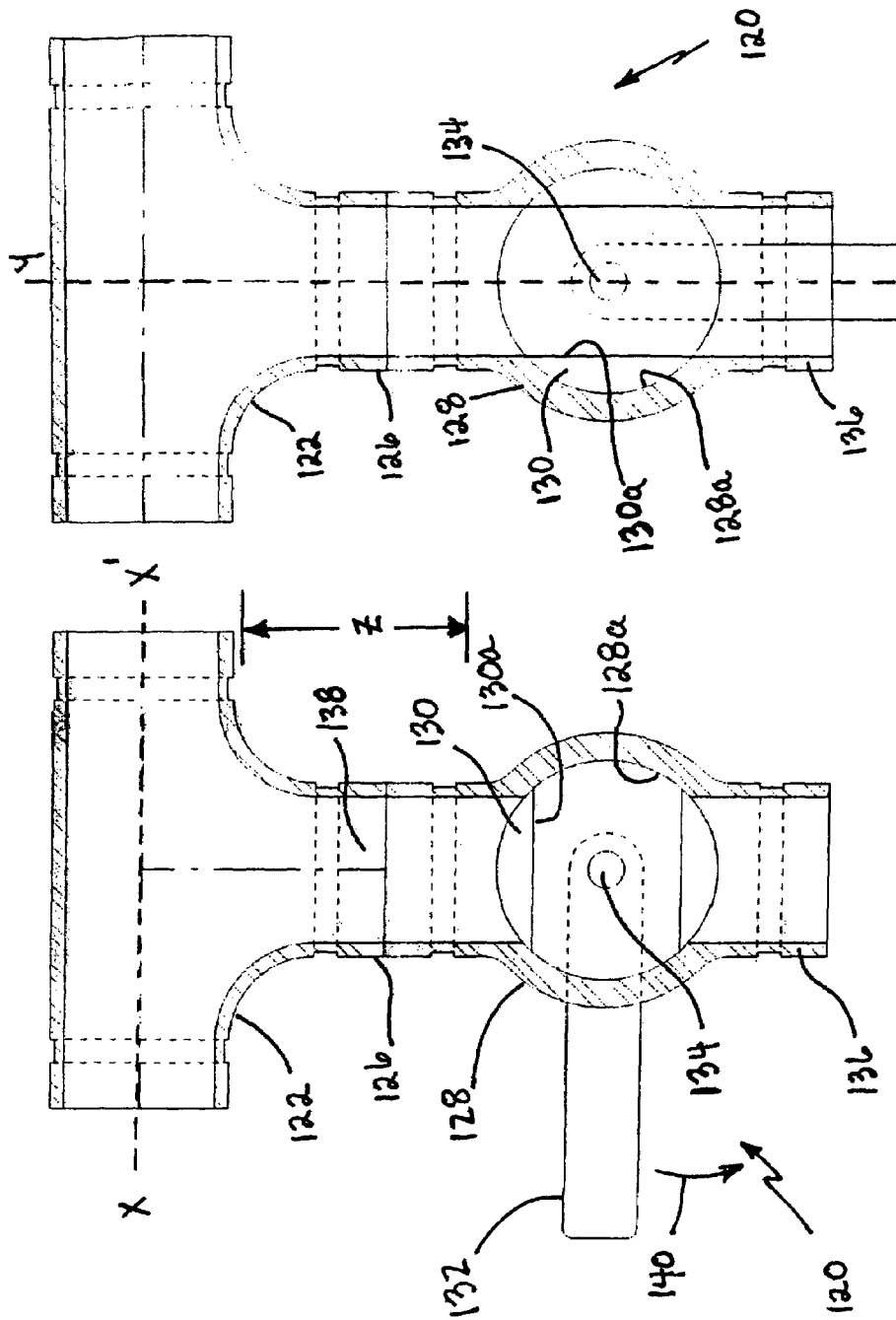

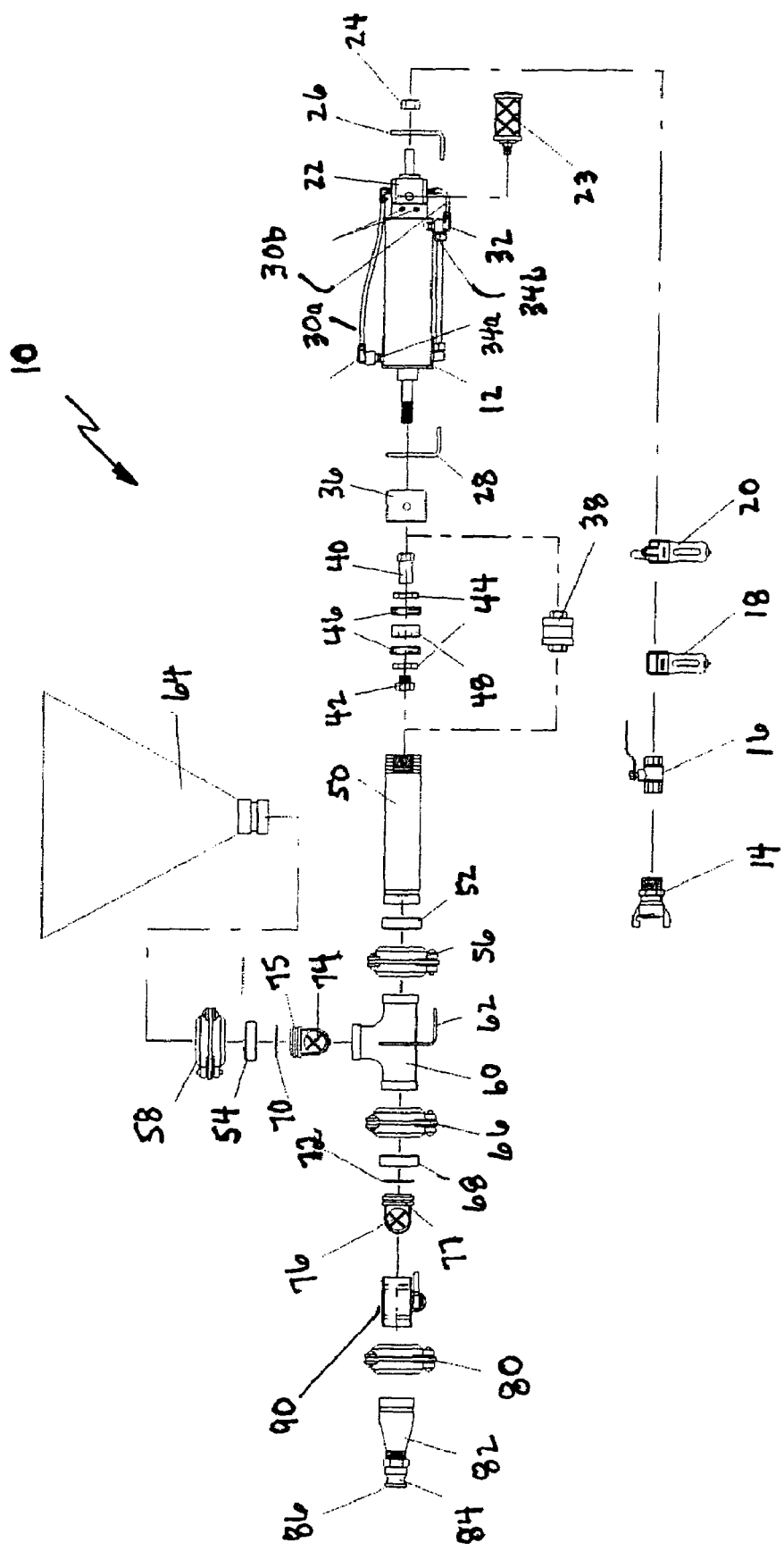

PRESSURE RELIEF VALVE FOR USE IN CEMENTITIOUS MATERIAL PUMPING SYSTEMS

FIELD OF THE INVENTION

This invention relates generally to systems for pumping a cementitious material under pressure, and is particularly directed to a hand-operated valve for safely releasing the pressure in a closed pumping system for cementitious materials.

BACKGROUND OF THE INVENTION

There are various types of reciprocating pumps used for pumping cementitious materials. A common form that these types of pumps take is that of a ball valve pump; that is, the flow of material through the pump is controlled by an inlet (suction) valve and a discharge valve, each of which consists of a ball and a seat. Thus, on the suction stroke the inlet ball unseats, allowing material to enter the pump housing, while the discharge valve is seated, preventing drawback of previously pumped material. On the discharge (extend) stroke, the discharge valve is forced open and the inlet (suction) valve is seated, thus preventing blowback into the hopper. This action is very simple, but very effective.

The intended purpose of these pumps is to transport and inject under pressure various cementitious materials ranging from fluid slurries to heavy sanded grouts, such as cement slurries, sanded cement mixes, bentonite mixes (with or without sand), repair mortars, high strength non-shrink grouts and self-leveling products. Common characteristics of these materials are that they are often fluid or semi-fluid, have a relatively high specific gravity and are often granular in composition. When the material is moving freely out of the pump and through hoses, the material generally maintains its integrity. However, under pressure, and particularly if the linear velocity is reduced, the materials tend to settle out of suspension and agglomerate within the hose and the discharge portion of the pump.

When this occurs, the pressure within the entire discharge system can increase to the maximum pump capacity. Due to the ball valve design, there is no internal means to relieve this pressure buildup. Therefore, the operator will customarily actuate a manually operated pressure dump valve to relieve system pressure so the hoses can safely be disconnected and cleaned. Unfortunately, due to the geometry of these types of valves, there is usually a considerable distance between the flow line and the actual valve mechanism, and often this conduit becomes plugged with material, rendering the valve useless and frequently necessitating its replacement.

Referring to FIGS. 1 and 2, there are show sectional views of a prior art pressure relief valve 120 in the closed and open positions, respectively. The pressure relief valve 120 is connected to a T-connector 122 by means of a fluid connector 126. Cementitious material is displaced in either direction along axis X-X' under pressure within a conduit (not shown for simplicity) to which the T-connector 122 is coupled. Connector 126 may be of conventional design such as of the threaded, pinned or U-clip type. Pressure relief valve 120 includes a housing 128 having a cylindrical expanded portion through which extends a cylindrical slot, or opening, 128a. Disposed within the cylindrical slot 128a and free to rotate therein is a cylindrical insert 130. Cylindrical insert 130 includes an elongated, linear slot 130a extending along a portion of the length of the cylindrical insert. Attached to one end of the cylindrical insert 130 by conventional means such as a threaded member 134 in the form of a screw is a handle 132. Disposed on the distal end of the valve housing 128 is a discharge end 136 of the pressure relief valve 120. Rotation of the handle 132 in the direction of arrow 140 shown in FIG. 1 causes counterclockwise rotation of the valve's cylindrical insert 130. 90° degree rotation of handle 132 from its orientation shown in FIG. 1 results in a corresponding 90° rotation of the valve's cylindrical insert 130 so that its elongated, linear slot 130a is aligned with the lengthwise axis Y-Y' of the pressure relief valve's housing 128 as shown in the sectional view of FIG. 2. In this position, the cementitious material flowing under pressure within T-connector 122 is discharged via the discharge end 136 of the pressure relief valve 120 so as to reduce the pressure within the conduit. As discussed above, one of the problems with this arrangement is the dead space 138 disposed between the conduit-connected portion of the T-connector 122 and the pressure relief valve 120. This dead space 138 disposed within the T-connector 122 and a portion of the pressure relief valve 120 is shown in FIG. 1 as having a length "Z". It is within this dead space 138 that the cementitious material tends to collect and set, or harden, when the cementitious material is displaced through the conduit and T-connector 122 combination with the pressure relief valve 120 in the closed position as shown in FIG. 1. This situation makes cleaning of the grout pumping system after use very difficult and may even necessitate replacement of the T-connector 122 and pressure relief valve 120 combination.

The present invention avoids this problem encountered in the prior art by positioning the active part of the valve directly in the flow line to eliminate any buildup of the cementitious material between the flow line and the valve, thus providing a positively acting valve capable of relieving system pressure and preventing plugging of the flow line and valve combination by the pumped material.

OBJECTS AND SUMMARY OF THE INVENTION

Accordingly, it is an object of the present invention to provide for the quick and safe discharge of pressure in a closed system for the pumping of cementitious materials.

It is another object of the present invention to provide a pressure relief valve for a closed system for pumping cementitious materials which avoids problems associated with the quick setting of the material during reduced pumping speed operation or following the termination of pumping.

It is a further object of the present invention to provide a hand-operated valve for quickly and safely discharging the pressure in a closed system within which a quick setting material is pumped which eliminates dead space in the system into which the material could flow and set, necessitating disassembly of the system for cleaning and possible replacement of components within which the material has set.

Yet another object of the present invention is to provide a hand-operator pressure relief valve for use in a closed system within which a permanent setting-type of material flows which is quickly and easily operated, of rugged and highly reliable design, low in cost and comprised of a minimum number of moving parts.

A still further object of the present invention is to allow for the quick and safe release of excessive pressure within a closed system for pumping cementitious material and thus reduce the possibility of injury to workers operating the pumping system.

The present invention contemplates a system for displacing a cementitious material comprising: a conduit; a hopper containing cementitious material and coupled to the conduit for discharging cementitious material into the conduit; a pump connected to the conduit on a first side of the hopper for displacing the cementitious material under pressure away from the hopper and toward a discharge end of the conduit; and a pressure relief valve directly attached to the conduit intermediate the hopper and the discharge end of the conduit, wherein there is no dead space between the conduit and the relief valve in which cementitious material can collect and set so as to clog the relief valve and render the pressure relief valve unuseable.

BRIEF DESCRIPTION OF THE DRAWINGS

The appended claims set forth those novel features which characterize the invention. However, the invention itself, as well as further objects and advantages thereof, will best be understood by reference to the following detailed description of a preferred embodiment taken in conjunction with the accompanying drawings, where like reference characters identify like elements throughout the various figures, in which:

FIGS. 1 and 2 are longitudinal sectional views of the combination of a T-connector and prior art pressure relief valve shown respectively in the closed and open positions;

FIG. 3 is an exploded side plan view of a cementitious material pumping system incorporating a pressure relief valve in accordance with the present invention;

DETAILED DESCRIPTION OF THE PREFERRED EMBODIMENTS

Figure 4A:
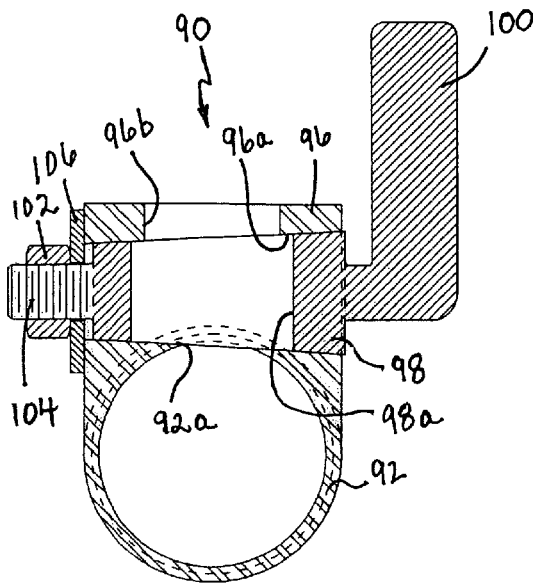
FIGS. 4a and 4b are transverse sectional views of a pressure relief valve in accordance with the principles of the present invention shown respectively in the open and closed positions.

Referring to FIG. 3, there is shown a side elevation view in exploded form of a cementitious material pumping system 10 in which the pressure relief valve 90 of the present invention is intended for use. In the following description, the term "cementitious material" is intended to include various materials also sometimes referred to as grout, mortar or finishing plaster. The inventive pressure relief valve 90 is not limited to use within the cementitious material pumping system 10 shown in FIG. 3, but has application in virtually any type of high pressure pumping system for use with cementitious materials.

The cementitious material pumping system 10 includes an air cylinder 12 coupled to a source of air under pressure, i.e., a compressor (which is not shown for simplicity), by means of an air coupling 14, an air valve 16, an air filter 18 and a lubricator 20. A rear cylinder bracket 26 is coupled by means of a rear mount nut 24 to the air cylinder 12 adjacent to where the lubricator 20 is also connected to the air cylinder. Air under pressure is provided to a shuttle valve assembly 22 mounted to one end of the air cylinder 12. Shuttle valve assembly 22 alternately routes air under pressure via first and second air hoses 30a and 30b and front and rear air valves 34a and 34b to opposed ends of the air cylinder 12 for displacing a piston (also not shown) within the air cylinder in alternating directions in a reciprocating manner. A 90° brass elbow coupler 32 connects the shuttle valve assembly 22 to the rear air valve 34b. A muffler 23 is connected to the shuttle valve assembly 22 to reduce the noise generated during operation of the pumping system 10. Connected to a second, opposed end of the air cylinder 12 is a front cylinder bracket 28 which, in combination with the rear cylinder bracket 26, is used for mounting the air cylinder to a fixed support base.

Also attached to the second end of the air cylinder 12 by means of a sleeve coupling 36 is a piston assembly 38. Piston assembly 38 has an outer housing within which are disposed a machine rod coupling 40, a pair of backiner plates 44, a pair of piston cups 46, a spacer plate 48, and a piston bolt 42. Piston assembly 38 is driven in a reciprocating manner by the bi-directional movement of air cylinder 12. Piston assembly 38 is coupled at a first end by means of the sleeve coupling 36 to the air cylinder, while a second, opposed end of the piston assembly is coupled to a first end of a cylindrical sleeve 50. A second, opposed end of the cylindrical sleeve 50 is coupled by means of the combination of a first coupling gasket 52 and a first coupling 56 to a first end of a tee assembly 60. A support bracket 62 is attached to the tee assembly 60 for securely mounting the tee assembly to a support structure.

Attached to an upper portion of the tee assembly 60 by means of the combination of a first ball seat O-ring 70, a second coupling gasket 68 and a second coupling 66 is a hopper 64 having an inverted frusto-conical, or tapered, shape. Cementitious material is deposited in hopper 64 and flows into the tee assembly 60 for displacement by means of the combination of the air cylinder 12 and piston assembly 38. A first ball 74 moveably disposed in a first ball seat 75 attached between hopper 64 and tee assembly 60 regulates the flow of cementitious material from the hopper into the tee assembly as described in detail below.

Cementitious material deposited from hopper 64 into the tee assembly 60 is displaced by means of the combination of air cylinder 12 and piston assembly 38 through the combination of a second ball seat O-ring 72, a third coupling gasket 54 and a third coupling 58 to a second ball 76 and second ball seat 77 combination. The combination of the second ball 76 and second ball seat 77 is coupled to a pressure relief valve 90 in accordance with the present invention. The inventive pressure relief valve 90 is coupled to a fluid discharge coupling 84 by means of the combination of a fourth coupling 80 and a reducer 82. Attached to the fluid discharge coupling 84 is a gasket 86 for connecting the cementitious material pumping system 10 to a conduit (not shown) for carrying the cementitious material to a desired location.

The cementitious material pumping system 10 operates in the following manner in displacing the cementitious material through the fluid discharge coupling 84 to a location where the cementitious material is to be used. As viewed in FIG. 3, rightward displacement of the piston assembly 38 under the influence of the air cylinder 12 causes the second ball 76 to be displaced rightwardly within the second ball seat 77 so as to prevent the flow of cementitious material through the fluid discharge coupling 84. With the rightward displacement of the piston assembly 38 under the influence of the air cylinder 12, the first ball 74 is displaced downwardly within the first ball seat 75 allowing cementitious material to drop from the hopper 64 into the tee assembly 63. Air cylinder 12 then displaces the piston assembly 38 in a leftward direction as viewed in FIG. 3 causing the first ball 74 to be displaced upwardly within the first ball seat 75 so as to prevent additional cementitious material from dropping into the tee connector 60, while urging cementitious material in a leftward direction through the tee assembly. The cementitious material displaces the second ball 76 leftward within the second ball seat 77 so as to open this valve. This allows cementitious material to be discharged from the pumping system 10 via fluid discharge coupling 84.

With cementitious material deposited within the tee assembly 60, the reciprocating action of the air cylinder 12 then causes the leftward displacement of the piston assembly 38 so as to displace the second ball 76 in a leftward direction in the second ball seat 77 and also causes the upward displacement of the first ball 74 within the first ball seat 75. This action causes the cementitious material within the tee assembly 60 to flow in a leftward direction toward and out of the fluid discharge coupling 84, while preventing the backflow of the cementitious material into the hopper 64. During the discharge process, the cementitious material flows through the pressure relief valve 90 of the present invention which is described in detail in the following paragraphs.

Figure 5A:
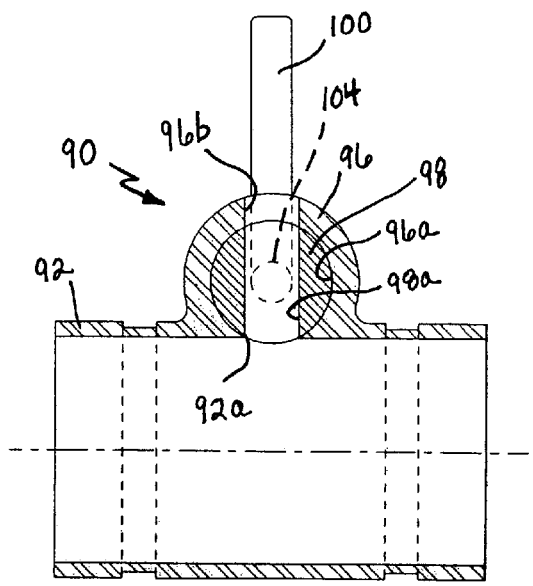
FIGS. 5a and 5b are longitudinal sectional views of the pressure relief valve of the present invention shown respectively in the open and closed positions.
Figure 4B:
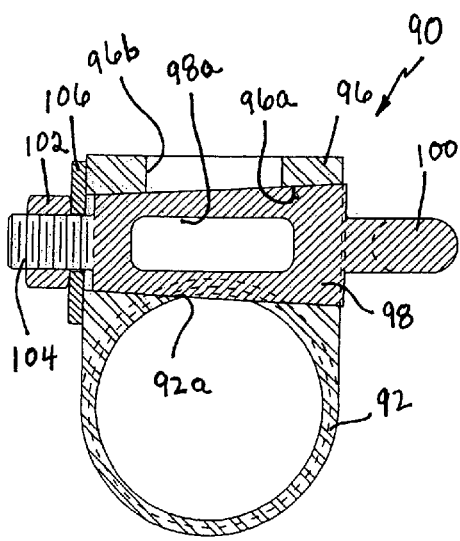
Figure 5B:
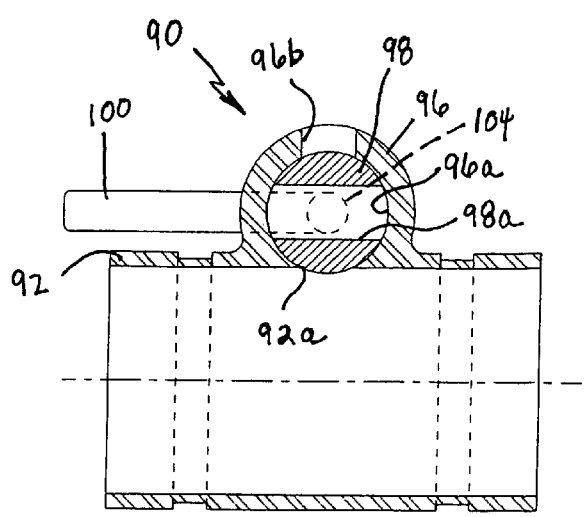

Referring to FIGS. 4a and 4b, there are respectively shown transverse sectional views of the pressure relief valve 90 of the present invention in the open and closed positions. FIGS. 5a and 5b are longitudinal sectional views respectively showing the pressure relief valve 90 of the present invention in the open and closed positions. Pressure relief valve 90 is integrally formed with, or mounted on, a hollow, cylindrically shaped conduit section 92. Pressure relief valve 90 includes a generally cylindrical housing 96 having its longitudinal axis aligned generally transverse to the longitudinal axis of the conduit section 92. Cementitious material is directed along the length of the valve's conduit section 92 either rightward or leftward as viewed in FIGS. 5a and 5b by the piston/cylinder combination described above. An elongated aperture 92a is provided in the lateral wall of the conduit section 92 to provide a flow channel between the inner portion of the conduit section 92 and the generally cylindrical slot 96a disposed within and extending substantially the length of the generally cylindrical housing 96. Also disposed in housing 96 in facing relation to elongated aperture 92a in conduit section 92 is an elongated aperture 96b. Disposed within the generally cylindrical slot 96a of housing 96 is a cylindrical member 98 which is free to rotate within the cylindrical housing. Cylindrical member 98 includes an elongated, linear slot 98a extending substantially the length of the cylindrical member and disposed between opposed lateral portions of the cylindrical member. When the cylindrical member's slot 98a is aligned with aperture 92a in conduit 92 and slot 96b in cylindrical housing 96, air under pressure and cementitious material are discharged from the conduit to release the pressure in the conduit. When slot 98a is not aligned with aperture 92a and slot 96b, the cementitious material is maintained under pressure within conduit 92 during pumping. One end of cylindrical member 98 is provided with a threaded extension shaft 104. Attached to the cylindrical member's threaded extension shaft 104 by means of a nut 102 is a washer 106 for securely maintaining the cylindrical member 98 within the cylindrical slot 96a of housing 96. Attached to a second opposed end of the cylindrical member 98 is a handle 100. By grasping the handle 100, cylindrical member 98 may be rotationally displaced within the slot 96a of housing 96 between an open position as shown in FIGS. 4a and 5a, and a closed position as shown in FIGS. 4b and 5b. In the open position, air under pressure and cementitious material are free to flow through the pressure relief valve 90 and be discharged from the conduit section 92. With the pressure release valve 90 in the closed position, cementitious material within a conduit of the pumping system is displaced toward the discharge end of the conduit to be used where intended. As shown in the sectional views of FIGS. 4a and 4b, the outer surface of cylindrical member 98 within housing 96 and slot 96a are tapered in a complementary manner so as to provide leak-proof sealing engagement between these two valve components. The inventive pressure relief valve 90 may be of similar composition to that of the conduit in the cementitious material pumping system, with the pressure relief valve preferably comprised of a hard metal or a high strength plastic. The valve's conduit section 92 may be connected to adjacent sections of a conduit in the pumping system by conventional means such as threaded engagement, U-shaped connecting pins, exterior clamps, or other conventional conduit coupling arrangement, or the pressure relief valve may be attached directly to or formed integrally with the cementitious material carrying conduit.

The essence of the present invention is the immediately adjacent positioning of the pressure relief valve 90 and the cementitious material carrying conduit 92 which eliminates any dead space in both the valve and the conduit within which the cementitious material tends to flow, collect and set. Indeed, in the inventive arrangement, portions of the pressure relief valve and the conduit are arranged in a overlapping, or colocated, manner to eliminate the possibility of any cementitious material residue remaining in the pumping system following its use.

While particular embodiments of the present invention have been shown and described, it will be obvious to those skilled in the relevant arts that changes and modifications may be made without departing from the invention in its broader aspects. Therefore, the aim in the appended claims is to cover all such changes and modifications as fall within the true spirit and scope of the invention. The matter set forth in the foregoing description and accompanying drawings is offered by way of illustration only and not as a limitation. The actual scope of the invention is intended to be defined in the following claims when viewed in their proper perspective based on the prior art.

I claim:

1. A pressure relief valve for use with a conduit carrying a cementitious material displaced under pressure, said pressure relief valve comprising:

a housing having a first inner generally cylindrical-shaped slot and attached to the conduit, wherein the attachment between the conduit and said housing defines a first aperture between the conduit and said cylindrical-shaped slot, said housing including a second aperture disposed in an opposed portion of said housing from said first aperture and located outside of the conduit;

a cylindrical member extending substantially the length of said generally cylindrical-shaped slot in a tight-fitting manner, wherein said cylindrical member is freely rotatable in said cylindrical-shaped slot and includes a second generally linear, elongated slot extending through said cylindrical member, wherein an inner portion of said cylindrical member is aligned with an inner surface of the conduit so as to eliminate dead space between said conduit and said pressure relief valve in which cementitious material can collect and set so as to clog said relief valve and render said relief valve unusable; and a handle attached to an end of said cylindrical member for moving said cylindrical member between an open position for discharging pressure from the conduit, wherein the cylindrical member's slot is aligned with the first and second apertures in said housing, and a closed position, wherein the cylindrical member's slot is not aligned with the first and second apertures in said housing and the conduit carries the cementitious material in a sealed manner.

2. The pressure relief valve of claim 1 wherein said pressure relief valve is attached to a lower surface of said conduit to allow cementitious material under the influence of gravity to flow out of said pressure relief valve following the release of pressure in the pressure relief valve.

3. The pressure relief valve of claim 2 wherein said pressure relief valve includes an outer hollow housing attached to said conduit and a generally cylindrical member disposed in and free to rotate within said outer hollow housing.

4. The pressure relief valve of claim 3 wherein said outer hollow housing includes first and second apertures disposed in opposed portions of said outer hollow housing through which said cementitious material flows when said pressure relief valve is open.

5. The pressure relief valve of claim 4 wherein said first aperture is disposed in flow communication with said conduit.

6. The pressure relief valve of claim 5 wherein said outer hollow housing is generally cylindrical in shape and has a longitudinal axis extending generally transverse to a longitudinal axis of said conduit.

7. The pressure relief valve of claim 6 wherein said first and second apertures extend substantially the length of said outer hollow housing.

8. The pressure relief valve of claim 4 wherein said cylindrical member includes an elongated, linear slot extending through said cylindrical member through which cementitious material flows when said pressure relief valve is open and said slot is aligned with said first and second apertures in said outer hollow housing.

9. The pressure relief valve of claim 8 wherein said slot extends substantially the length of said cylindrical member.

10. The pressure relief valve of claim 9 wherein said outer hollow housing includes a generally cylindrical slot extending through and along the length of said outer hollow housing within which said cylindrical member is disposed in tight-fitting contact.

11. The pressure relief valve of claim 10 wherein said generally cylindrical slot includes a first open end and a second opposed partially closed end.

12. The pressure relief valve of claim 11 wherein the second partially closed end of the cylindrical slot includes an aperture and the first end of said cylindrical member includes a coupling shaft extending therefrom and inserted through the aperture, said pressure relief valve further comprising a coupling member attached to said shaft for securely maintaining said cylindrical member within said cylindrical slot.

13. The pressure relief valve of claim 12 wherein the second partially closed end of the cylindrical slot includes a washer disposed on an outer surface of said outer hollow housing and having an aperture through which said coupling shaft extends.

14. The pressure relief valve of claim 12 wherein said coupling shaft is threaded and said coupling member is a nut.

15. The pressure relief valve of claim 12 further comprising a handle attached to a second opposed end of said cylindrical member for rotationally displacing said cylindrical member between an open position wherein the cylindrical member's slot is aligned with the first and second apertures of said outer hollow housing and a closed position wherein said slot is not aligned with said first and second apertures.

16. The pressure relief valve of claim 15 wherein said handle rotates through 90° between the open and closed positions.

17. The pressure relief valve of claim 10 wherein the outer hollow housing's cylindrical slot and the cylindrical member's outer surface are tapered in a complementary manner to provide sealing engagement between said outer hollow housing and said cylindrical member.

18. The pressure relief valve of claim 1 wherein said pressure relief valve is comprised of a high strength metal or plastic.

19. The pressure relief valve of claim 1 further comprising a T-coupling having opposed ends connected to said conduit in a sealed manner between a hopper and the discharge end of said conduit, and wherein said pressure relief valve is attached directly to said T-coupling.

\* \* \* \* \*